(12) United States Patent
Kim

(10) Patent No.: US 7,973,879 B2
(45) Date of Patent: Jul. 5, 2011

(54) BACKLIGHT UNIT AND LIQUID CRYSTAL DISPLAY DEVICE HAVING FIRST AND SECOND DIFFUSION LAYERS THAT HAVE DIFFERENT HAZE VALUES

(75) Inventor: Min-Joo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 10 days.

(21) Appl. No.: 12/230,314

(22) Filed: Aug. 27, 2008

(65) Prior Publication Data

US 2009/0059124 A1 Mar. 5, 2009

(30) Foreign Application Priority Data

Aug. 28, 2007 (KR) .................. 10-2007-0086654

(51) Int. Cl.
G02F 1/1335 (2006.01)
G09F 13/04 (2006.01)
(52) U.S. Cl. ...................... 349/64; 362/97.2
(58) Field of Classification Search .............. 349/64; 362/97.2
See application file for complete search history.

(56) References Cited

U.S. PATENT DOCUMENTS

| 6,091,547 | A | | 7/2000 | Gardiner et al. | |
|---|---|---|---|---|---|
| 6,469,683 | B1 | * | 10/2002 | Suyama et al. | 345/32 |
| 6,723,392 | B1 | * | 4/2004 | Jinnai et al. | 428/1.1 |
| 7,569,257 | B2 | * | 8/2009 | Ha et al. | 428/1.1 |
| 2001/0050736 | A1 | * | 12/2001 | Lee et al. | 349/65 |
| 2004/0100597 | A1 | * | 5/2004 | Fukuda et al. | 349/112 |
| 2004/0141103 | A1 | * | 7/2004 | Kotchick et al. | 349/61 |
| 2006/0038935 | A1 | * | 2/2006 | Kim | 349/64 |
| 2006/0087865 | A1 | * | 4/2006 | Ha et al. | 362/607 |
| 2006/0239008 | A1 | * | 10/2006 | Kim et al. | 362/330 |
| 2007/0215793 | A1 | * | 9/2007 | Gruhlke et al. | 250/221 |
| 2007/0279549 | A1 | * | 12/2007 | Iwasaki | 349/64 |
| 2008/0111945 | A1 | * | 5/2008 | Epstein et al. | 349/62 |

FOREIGN PATENT DOCUMENTS

| CN | 1357091 | 7/2002 |
|---|---|---|
| CN | 1570680 | 1/2005 |
| JP | 3860298 | 12/2006 |

* cited by examiner

Primary Examiner — Mark A Robinson
Assistant Examiner — Paul C Lee
(74) Attorney, Agent, or Firm — Morgan, Lewis & Bockius LLP

(57) ABSTRACT

A backlight unit for a liquid crystal display device includes a reflection sheet, at least one lamp arranged over the reflection sheet, a diffuser plate over the at least one lamp, the diffuser plate including a base plate of a transparent material, a diffusion layer at a first surface of the base plate facing the at least one lamp, and a light concentrating layer at a second surface of the base plate opposite to the first surface and formed of a same material as the base plate, and optical sheets over the diffuser plate.

10 Claims, 9 Drawing Sheets

BACKLIGHT UNIT AND LIQUID CRYSTAL DISPLAY DEVICE HAVING FIRST AND SECOND DIFFUSION LAYERS THAT HAVE DIFFERENT HAZE VALUES

This application claims the benefit of Korean Patent Application No. 2007-0086654 filed in Korea on Aug. 28, 2007, which is hereby incorporated by reference for all purposes as if fully set forth herein.

BACKGROUND OF THE INVENTION

1. Field of the Invention

The invention relates to a liquid crystal display device, and more particularly, to a backlight unit for a liquid crystal display device.

2. Discussion of the Related Art

With the rapid development of information technology, flat panel display (FPD) devices having advantages of thin thicknesses, light weights and low power consumption, have been developed and have replaced cathode ray tubes (CRTs). The FPD devices include liquid crystal display (LCD) devices, plasma display panels (PDPs), electroluminescent display (ELD) devices and field emission display (FED) devices.

Among these devices, liquid crystal display (LCD) devices have been widely used for monitors of notebook computers, monitors for personal computers and televisions because the LCD devices are excellent at displaying moving images and have a relatively high contrast ratio.

LCD devices are not self-luminescent and require an additional light source. By disposing a backlight unit at the rear side of a liquid crystal panel to emit light into the liquid crystal panel, discernible images can be displayed. Backlight units may include cold cathode fluorescent lamps (CCFLs), external electrode fluorescent lamps (EEFLs) or light-emitting diodes (LEDs) as a light source.

Backlight units are classified as edge type or direct type according to the position of the light source with respect to a display panel. In edge-type backlight units, one or a pair of lamps are disposed at one side or at each of two sides of a light guide panel of a backlight unit. In direct-type backlight units a plurality of lamps are disposed directly under the display panel.

FIG. 1 is a cross-sectional view illustrating a liquid crystal display (LCD) device including a direct-type backlight unit according to the related art. The related art LCD device includes a liquid crystal panel 10, a backlight unit 50, a support main 60, a top cover 70 and a cover bottom 80. The liquid crystal panel 10 includes upper and lower substrates 13 and 15. A printed circuit board (not shown) is attached at a side of the liquid crystal panel 10. The backlight unit 50 is disposed under the liquid crystal panel 10. The support main 60 surrounds side surfaces of the liquid crystal panel 10 and the backlight unit 50. The top cover 70 covers edges of a front surface of the liquid crystal panel 10, and the cover bottom 80 covers a rear surface of the backlight unit 50. The top cover 70 and the cover bottom 80 are combined with the support main 60 to thereby constitute one-united body.

The backlight unit 50 includes a reflection sheet 40, a plurality of lamps 22, a diffuser plate 30, and a plurality of optical sheets 20. The plurality of lamps 22 are disposed over the reflection sheet 40, and the diffuser plate 30 and the plurality of optical sheets 20 are sequentially disposed over the plurality of lamps 22.

The plurality of optical sheets 20 includes a diffuser sheet and at least one light-concentrating sheet. The plurality of optical sheets 20 will be described in more detail with reference to FIG. 2.

FIG. 2 is a view schematically illustrating the diffuser plate and the plurality of optical sheets of FIG. 1. As shown in FIG. 2, the plurality of optical sheets 20 including a diffuser sheet 24 and a light-concentrating sheet 26 are sequentially disposed over the diffuser plate 30.

The diffuser plate 30 may be formed of a transparent acrylic resin, polymethylmethacrylate (PMMA) or thermoplastic polyethylene terephthalate (PET) including irregular particles therein. The diffuser plate 30 may have various haze properties according to light uniformity. The diffuser plate 30 directs light emitted from the plurality of lamps 22 of FIG. 1 towards the liquid crystal panel 10 of FIG. 1 and diffuses light such that the light is incident on the liquid crystal panel 10 of FIG. 1 within a relatively wide range of angles.

The diffuser sheet 24 positioned over the diffuser plate 30, generally, is composed of a base film of PET and acrylic resin layers on both sides of the base film, each of which includes light-diffusing materials such as beads. The diffuser sheet 24 diffuses light passing through the diffuser plate 30, so that there may be no patched portion due to partially centralized light, and the diffuser sheet 24 directs the light towards the light-concentrating sheet 26.

The light-concentrating sheet 26 includes a base film of PET and prism patterns 28 regularly arranged on an upper surface of the base film. Generally, the prism patterns 28 reflect or concentrate light.

FIG. 3 is a view illustrating paths of light passing through the light-concentrating sheet of FIG. 2.

As shown in FIG. 3, light incident on the light-concentrating sheet 26 may have an angle of about 5 degrees with respect to the normal to a lower surface of the light-concentrating sheet 26. Light incident on a light-concentrating region A is refracted by the prism patterns 28 and is concentrated toward the liquid crystal panel 10 of FIG. 1 to thereby cause an increase in brightness. Light incident on a total reflection region B is totally reflected downward at surfaces of the prism patterns 28.

The downward reflected light is re-reflected by the reflection sheet 40 of FIG. 1 and is re-supplied to the light-concentrating sheet 26. Therefore, a loss of light is minimized by the circulation of light.

However, in addition to the concentration and reflection of light in the light-concentrating sheet 26, there is a loss of light due to side lobes. This causes a decrease in light efficiency and a lowering in viewing angle properties of the display.

More particularly, in the figure, a region designated by C means a region where there occur side lobes, wherein the region C is referred to as a side lobe region hereinafter.

FIG. 4 is a view of illustrating angular distribution of brightness of light passing through the light-concentrating sheet of FIG. 2.

As shown in FIG. 4, there are bright areas at both sides with respect to a symmetrical point at a center, that is, side lobe regions C. Light incident on the side lobe region C is refracted at the surface of the prism patterns 28 toward an undesired direction and is not incident on the liquid crystal panel 10 of FIG. 1 to thereby be wasted. In other words, there is light leakage in the side lobe regions C.

To solve the problems described above, a reflective polarizing sheet or a diffusion film for recycling light may be further disposed over the light-concentrating sheet to decreased or removed the side lobes to thereby improve a light efficiency and viewing angle properties. However, there still exist the side lobes.

SUMMARY OF THE INVENTION

Accordingly, the present invention is directed to a backlight unit and a liquid crystal display device including the same that substantially obviate one or more of the problems due to limitations and disadvantages of the related art.

An advantage of the present invention is to provide a backlight unit and a liquid crystal display device including the same that minimize or remove side lobes of a backlight unit and improve a light efficiency and viewing angle properties, thereby displaying images of uniform brightness and high quality.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of embodiments of the invention, as embodied and broadly described, a backlight unit for a liquid crystal display device includes a reflection sheet, at least one lamp arranged over the reflection sheet, a diffuser plate over the at least one lamp, the diffuser plate including a base plate of a transparent material, a diffusion layer at a first surface of the base plate facing the at least one lamp, and a light concentrating layer at a second surface of the base plate opposite to the first surface and formed of a same material as the base plate, and optical sheets over the diffuser plate.

In another aspect, a liquid crystal display device includes a liquid crystal panel, optical sheets under the liquid crystal panel, a diffuser plate under the optical sheets, the diffuser plate including a diffusion layer and a light-concentrating layer having dome-shaped lenticular lenses, at least one lamp under the diffuser plate, and a reflection sheet under the at least one lamp.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 5:
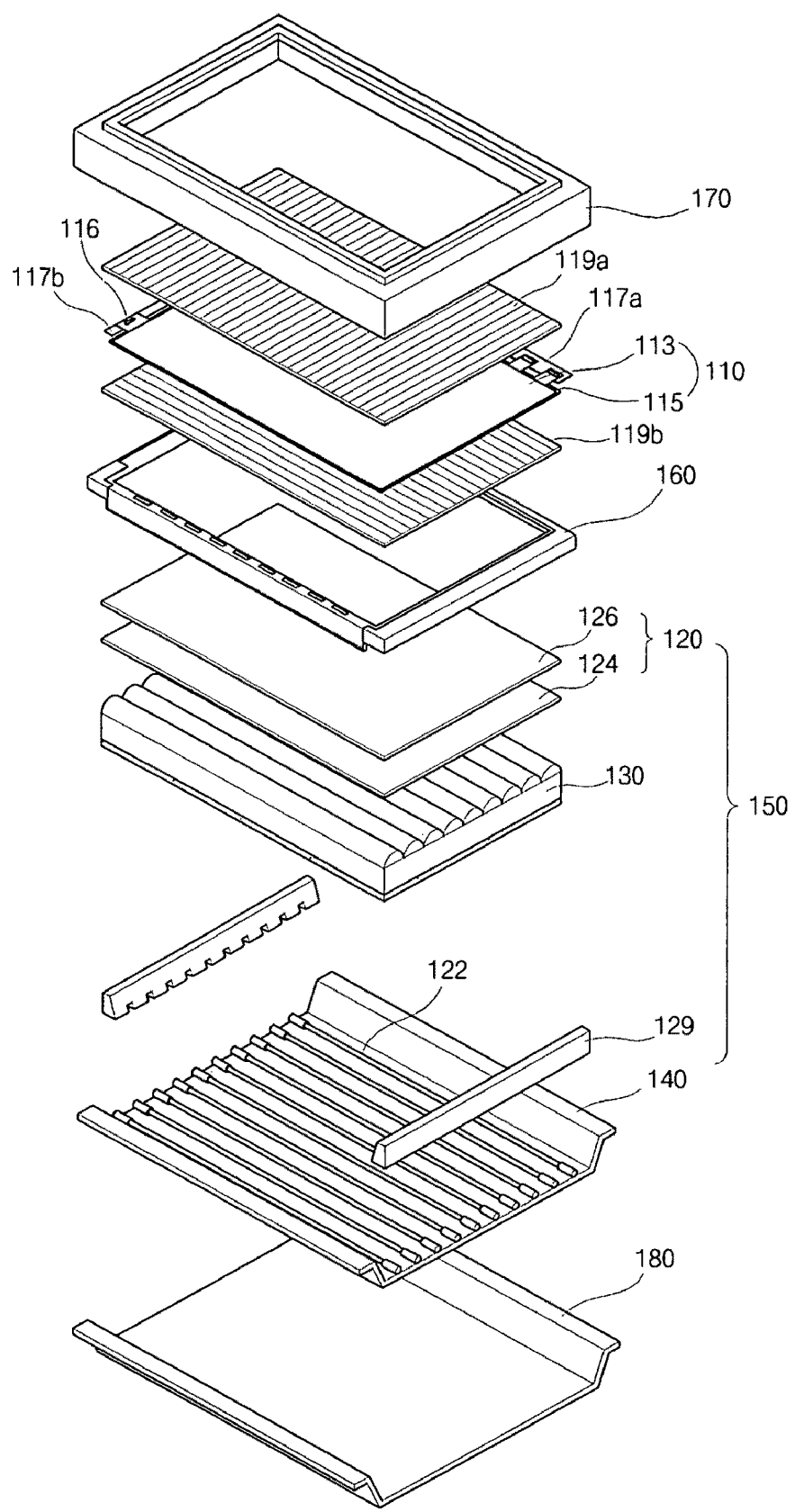
FIG. 5 is an expanded perspective view of an LCD module according to an exemplary embodiment of the present invention.

FIG. 5 is an expanded perspective view of an LCD module according to an exemplary embodiment of the present invention.

In FIG. 5, an LCD module includes a liquid crystal panel 110, a backlight unit 150, a support main 160, a top cover 170, and a cover bottom 180.

The liquid crystal panel 110 displays images. The liquid crystal panel 110 includes first and second substrates 113 and 115 facing and attached to each other with a liquid crystal layer interposed therebetween. Source and gate printed circuit boards 117a and 117b are attached to adjacent sides of the liquid crystal panel 110 via flexible printed circuit boards 116, for example, respectively. The source and gate printed circuit boards 117a and 117b are bent toward respective side surfaces or a rear surface of the cover bottom 180 during a module assembly process. The gate printed circuit board 117b provides gate lines (not shown) with scanning signals for turning on/off thin film transistors(not shown), and the source printed circuit board 117a provides data lines (not shown) with image signals for each frame.

In addition, upper and lower polarizers 119a and 119b are attached at upper and lower surfaces of the liquid crystal panel 110, respectively.

The backlight unit 150 is disposed under the liquid crystal panel 110. The support main 160 of a rectangular frame covers side surfaces of the backlight unit 150 and the liquid crystal panel 110. The top cover 170 covers edges of the front surface of the liquid crystal panel 110, and the cover bottom 180 covers a rear surface of the backlight unit 150. The top cover 170 and the cover bottom 180 are combined with the support main 160 to thereby constitute one-united body.

The backlight unit 150 includes a reflection sheet 140, a plurality of lamps 122 arranged over the reflection sheet 140, a diffuser plate 130 over the lamps 122, and a plurality of optical sheets 120 over the diffuser plate 130. The lamps 122 are fixed by a pair of side supports 129, which are combined with the cover bottom 180. The diffuser plate 130 is used for improving uniformity of the brightness. The optical sheets 120 include a light-concentrating sheet 124 and a reflective polarizing sheet 126.

Although not shown in the figure, the backlight unit 150 may further include lamp guides. The lamp guides prevent the plurality of optical sheets 120 from sagging to thereby maintain a substantially uniform distance between the lamps 122 and the optical sheets 120 and to prevent the lamps 122 from shaking or breaking down due to exterior impacts.

Light emitted from the lamps 122 passes through the diffuser plate 130 and the optical sheets 120 and is redirected into a relatively uniform plane light beam. The plane light beam is provided to the liquid crystal panel 110, thereby enabling the liquid crystal panel 110 to display images.

In the present invention, the diffuser plate 130 may include a diffusion layer and a light-concentrating layer, and the reflective polarizing sheet 126 may have haze properties of more than 60%. Therefore, the liquid crystal display device may have wide viewing angles, high light-concentrating efficiency and high front brightness.

Figure 6:
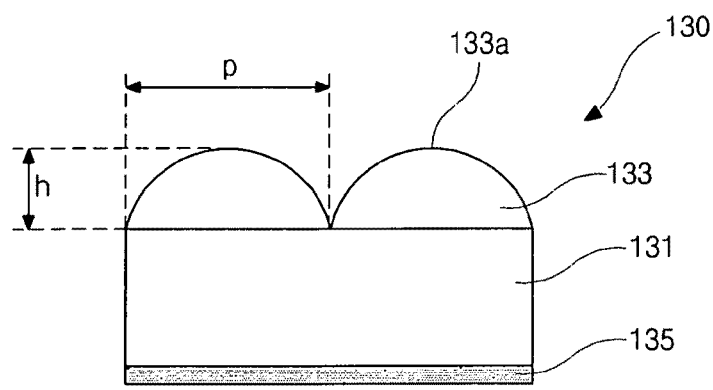
FIG. 6 is a cross-sectional view of schematically illustrating a structure of a diffuser plate of FIG. 5.

FIG. 6 is a cross-sectional view of schematically illustrating a structure of a diffuser plate of FIG. 5.

In FIG. 6, the diffuser plate 130 includes a diffusion layer 135 for diffusing light emitted from the lamps 122 of FIG. 5 and a light-concentrating layer 133 for concentrating the light diffused by the diffusion layer 135.

More particularly, the diffusion layer 135 is formed on a lower surface of a base plate 131, and the light-concentrating layer 133 is formed on an upper surface of the base plate 131 opposite to the lower surface of the base plate 131.

The diffusion layer 135 may have a Gaussian angle of 12 degrees. In a Gaussian scatterer, the Gaussian angle relates to the angular distribution of brightness according to θ, which is expressed by the following equation (1).

$$P(\theta)=P\exp[(-0.5)(\theta/\sigma)^2]$$ equation (1).

Here, $P(\theta)$ is intensity in a θ direction, $P_0$ indicates intensity in the specular direction, and σ means a standard deviation of the Gaussian distribution in degrees, that is, a distribution deviated from $P_0$. The intensity $P_0$ and the standard deviation σ are determined by the Gaussian angle. By controlling the Gaussian angle of the diffusion layer 135, expectable brightness and viewing angles can be obtained.

The Gaussian angle of the diffusion layer 135 can be controlled by adding a light-diffusing agent such as beads into the diffuser plate 130 or by forming fine patterns at a lower surface of the diffusion layer 135 without beads.

The beads may be included in acrylic resin. The beads scatter light incident on the diffusion layer 135 and prevent light from being locally concentrated. Alternatively, the diffusion layer 135 without the beads may have a Gaussian angle controlled according to shapes of the fine patterns. The fine patterns may be one of elliptical patterns, polygonal patterns, and so on. The fine patterns may be hologram patterns such that incident light is refracted into an asymmetrical direction to the incident direction by interference patterns, whereby concentrated light may be diffused with more inclined angles. Therefore, light is scattered and is prevented from being locally concentrated.

The light-concentrating layer 133 may have dome-shaped lenticular lenses 133a that are arranged in a row and protrusively. The lenticular lenses 133a are close to each other such that peak portions and valley portions alternate with one another in a horizontal cross-section of the lenticular lenses 133a. The lenticular lenses 133a may be formed of the same transparent material as the base plate 131. The lenticular lenses 133a may have an apex height h of 200 μm and a width p of 20 μm to 400 μm.

Figure 1:
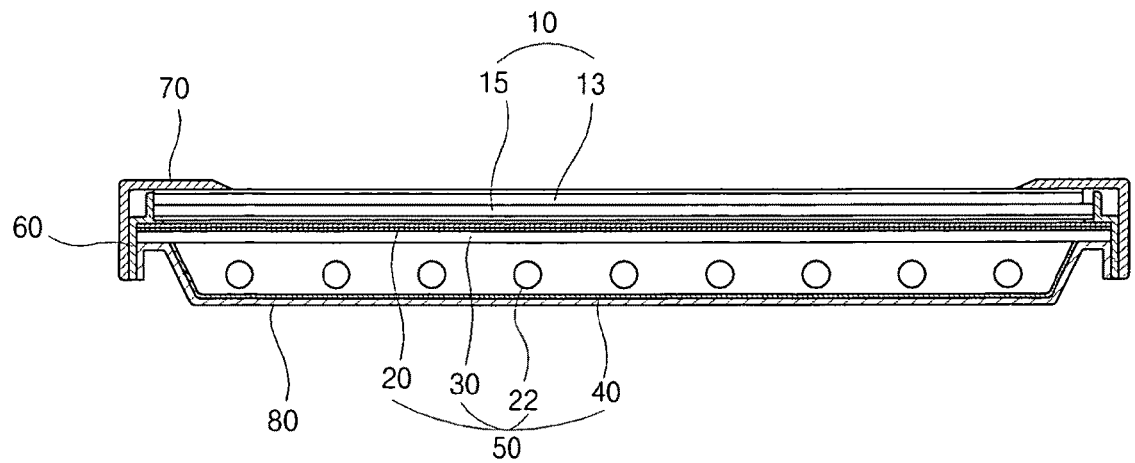
FIG. 1 is a cross-sectional view illustrating a liquid crystal display (LCD) device including a direct-type backlight unit according to the related art.
Figure 2:
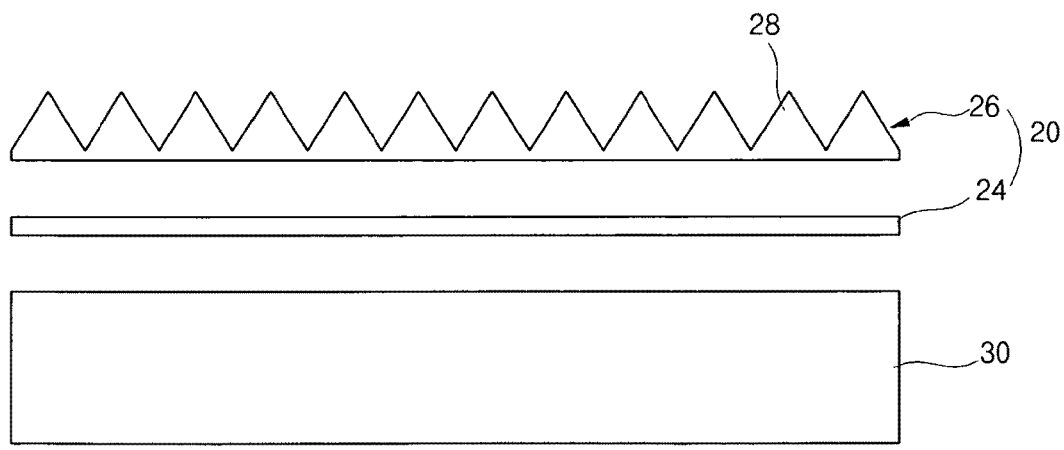
FIG. 2 is a view schematically illustrating the diffuser plate and the plurality of optical sheets of FIG. 1.
Figure 3:
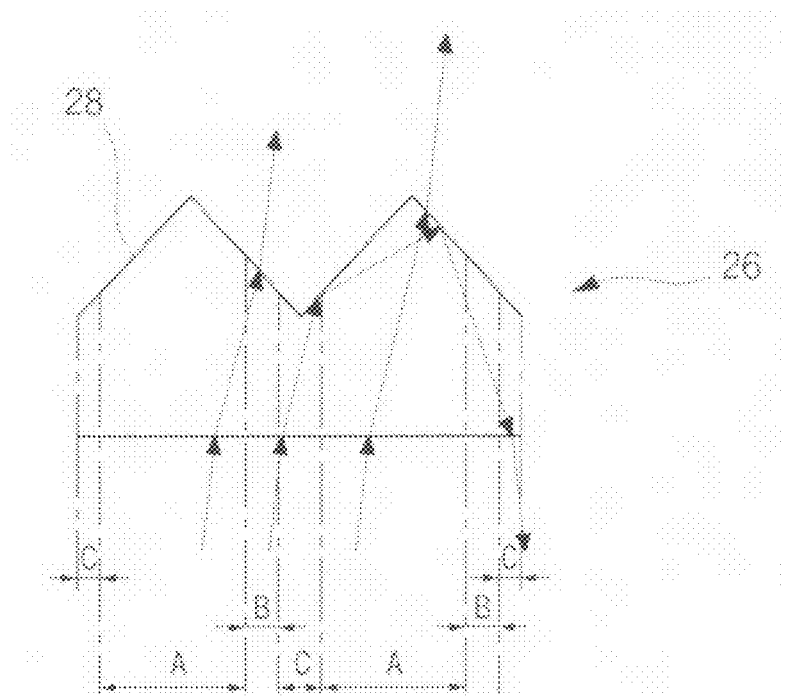
FIG. 3 is a view illustrating paths of light passing through the light-concentrating sheet of FIG. 2.
Figure 4:
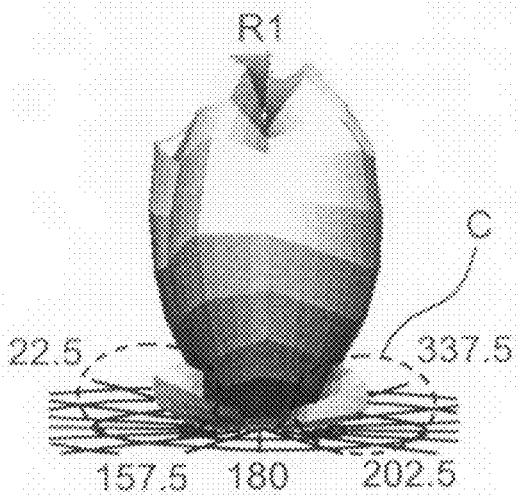
FIG. 4 is a view of illustrating angular distribution of brightness of light passing through the light-concentrating sheet of FIG. 2.

Accordingly, in the diffuser plate 130 of the present invention, the brightness at a front side is improved by removing light incident on the side lobe regions C of FIG. 4 due to the diffusion layer 135, and the efficiency of concentrating light passing through the diffuser plate 130 is increased by optimizing the height h and the width p of the lenticular lenses 133a of the light-concentrating layer 133.

More detail explanations will be followed by comparing simulation results using the diffuser plate 130 of the present invention.

Figure 7A:
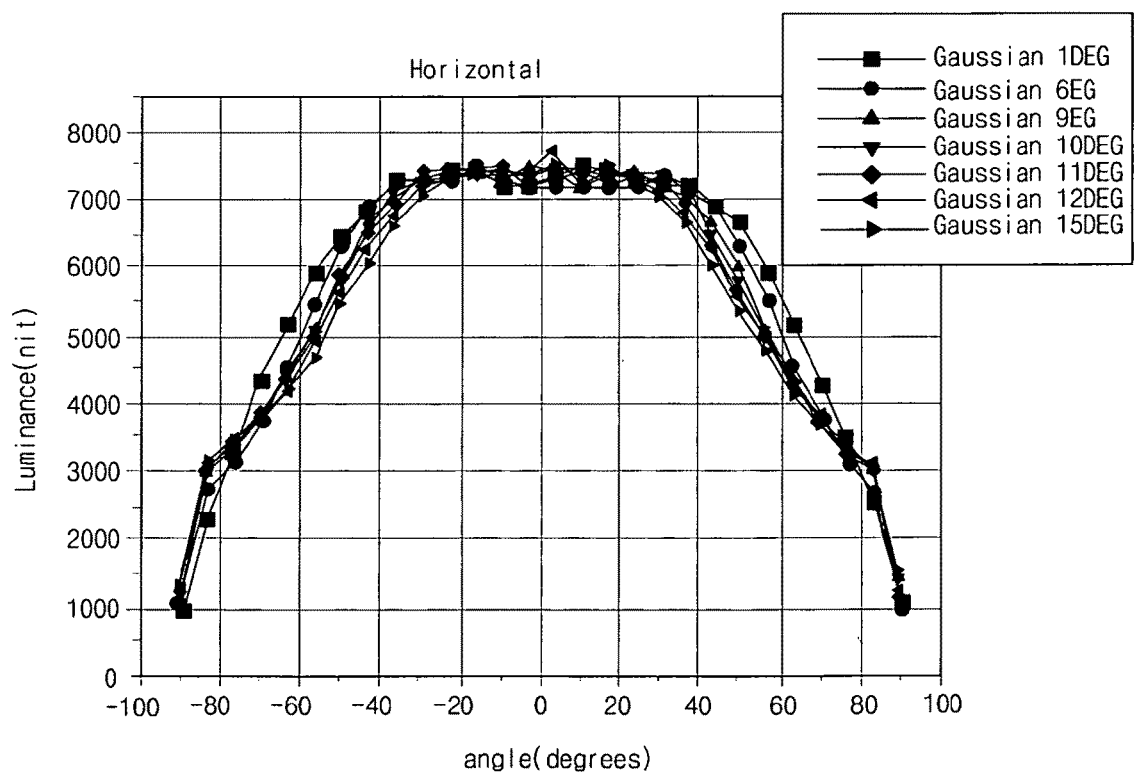
FIGS. 7A and 7B are graphs of illustrating viewing angle properties according to Gaussian angles of a diffusion layer for a diffuser plate of the present invention.
Figure 7B:
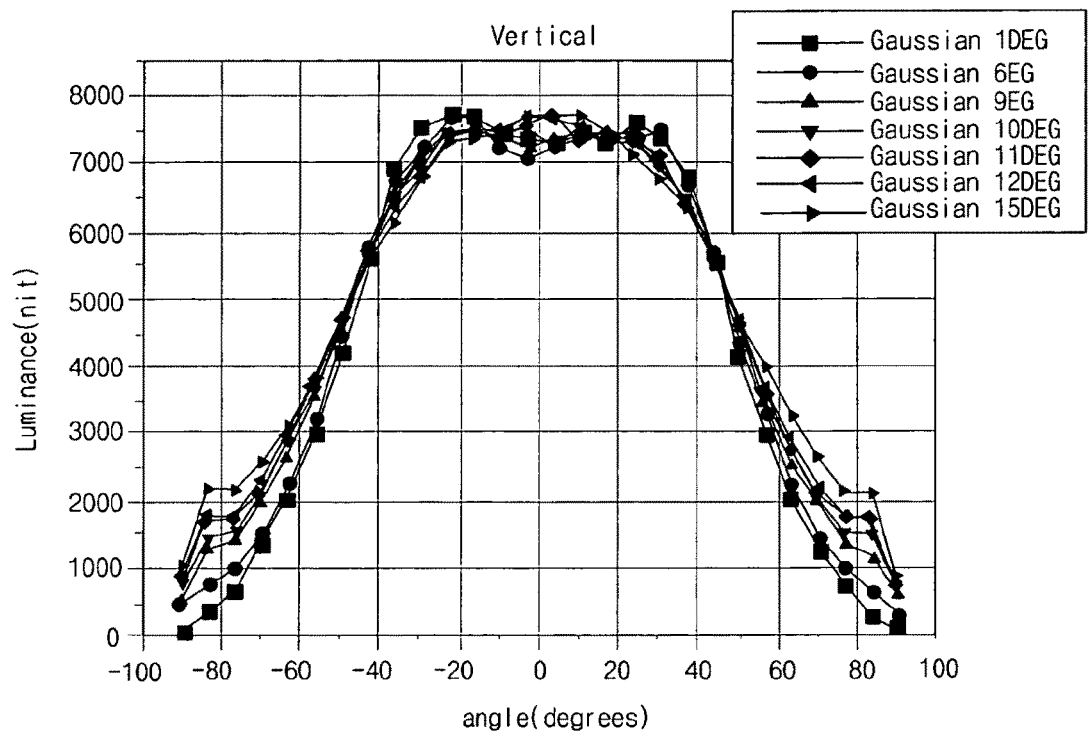

FIGS. 7A and 7B are graphs of illustrating viewing angle properties according to Gaussian angles of a diffusion layer for a diffuser plate of the present invention. FIG. 7A shows the viewing angle properties measured according to the Gaussian angles when the lenticular lenses 133a of the light-concentrating layer 133 of the diffuser plate 130 are arranged parallel with the lamps 122 of FIG. 5. FIG. 7B shows the view angles properties when the lenticular lenses 133a are arranged vertically to the lamps 122.

In FIG. 7A, when the Gaussian angle is 12 degrees, there is the highest peak point at a center. In FIG. 7B, when the Gaussian angle is within a range of 12 to 15 degrees, there is the highest peak point at the center. The results show that light passing through the diffuser plate 130 is highly concentrated at the center when the Gaussian angle is more than 12 degrees and thus high brightness is obtained.

By the way, as shown in FIG. 7B, when the lenticular lenses 133a are vertical to the lamps 122, there exist side lobe regions as the Gaussian angle increases. Accordingly, when the Gaussian angle is 12 degrees, the optimum result is attained.

Figure 8A:
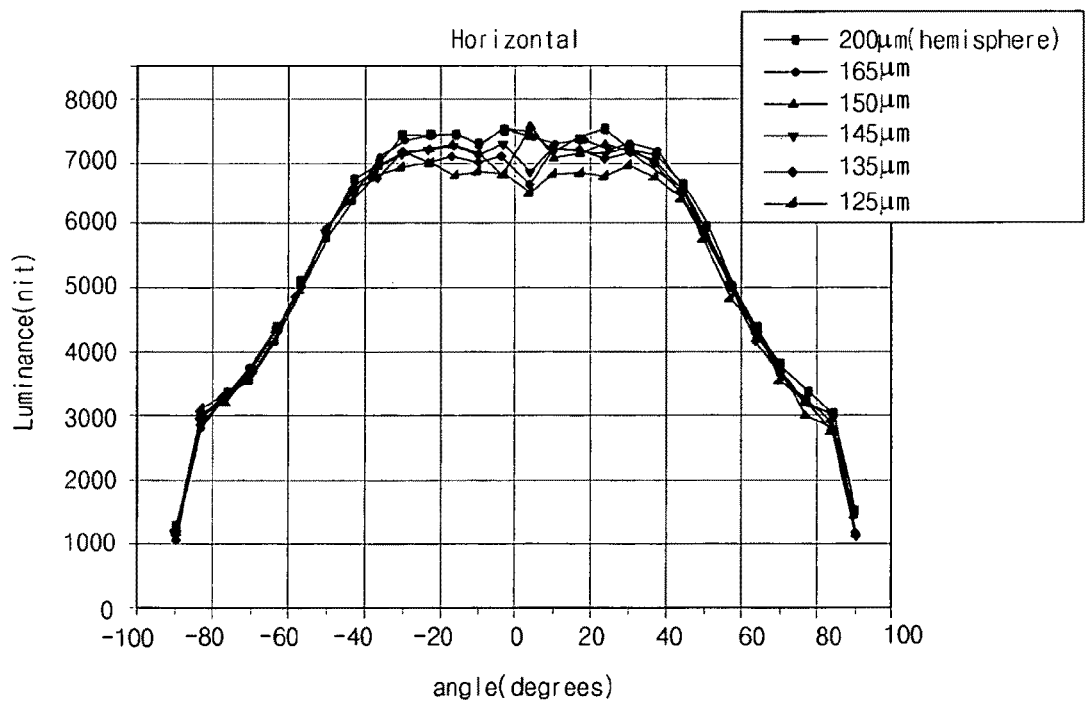
FIGS. 8A and 8B are graphs of illustrating viewing angle properties according to curvatures of lenticular lenses of a light-concentrating layer for a diffuser plate of the present invention.
Figure 8B:
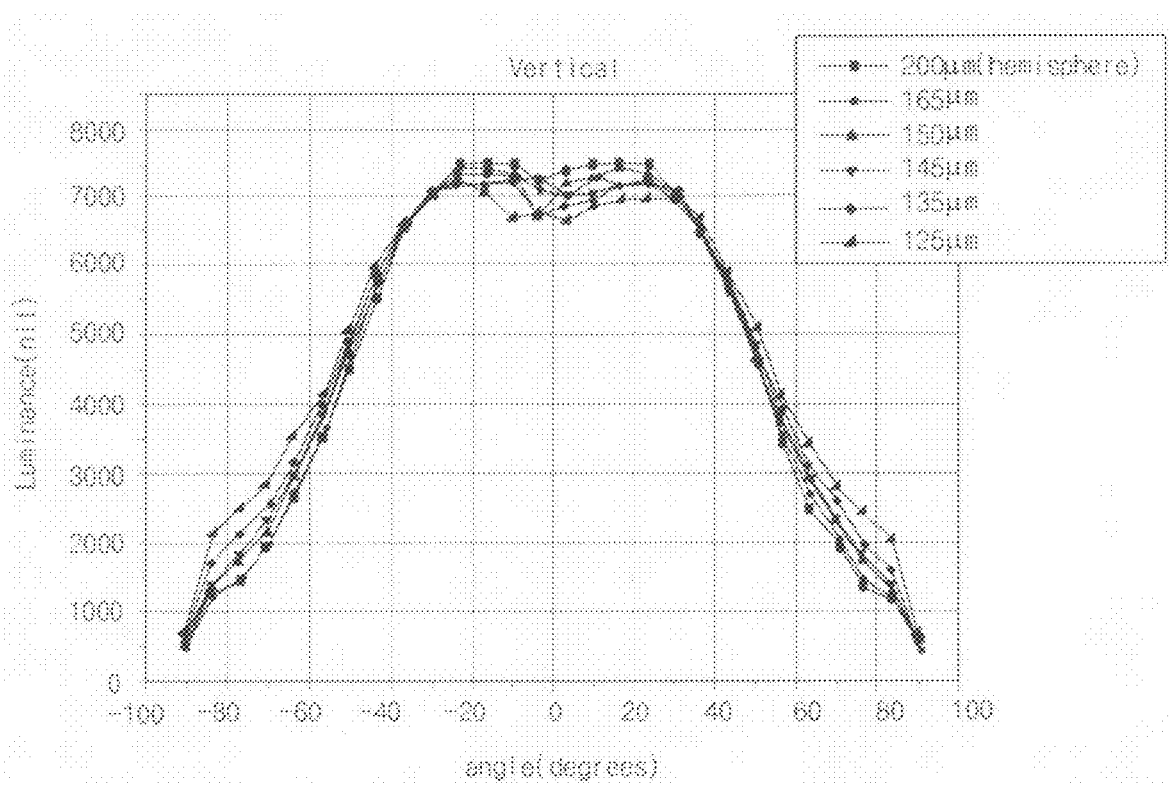

FIGS. 8A and 8B are graphs of illustrating viewing angle properties according to curvatures of lenticular lenses of a light-concentrating layer for a diffuser plate of the present invention. FIG. 8A shows the viewing angle properties measured according to the curvatures of lenticular lenses when the lenticular lenses 133a of the light-concentrating layer 133 of the diffuser plate 130 are arranged parallel with the lamps 122 of FIG. 5. FIG. 8B shows the view angles properties when the lenticular lenses 133a are arranged vertically to the lamps 122. Here, the lenticular lenses 133a have a width p of 400 μm, and the diffusion layer 135 has a Gaussian angle of 12 degrees.

In FIGS. 8A and 8B, it is shown that the brightness is largely changed at the center according to the curvatures of the lenticular lenses 133a. When the lenticular lenses 133a have a perfect hemisphere shape with a curvature of 200 μm, the brightness is highest, and light is highly concentrated.

For example, when the curvature of the lenticular lenses 133a is 150 μm, the brightness is reduced by about 4% as compared with the brightness when the curvature is 200 μm.

Figure 9A:
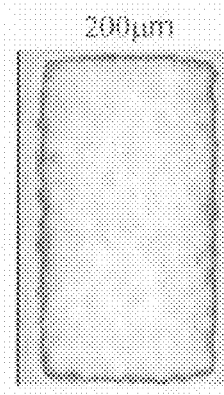
FIGS. 9A to 9D are views of illustrating brightness according to curvatures of lenticular lenses.
Figure 9B:
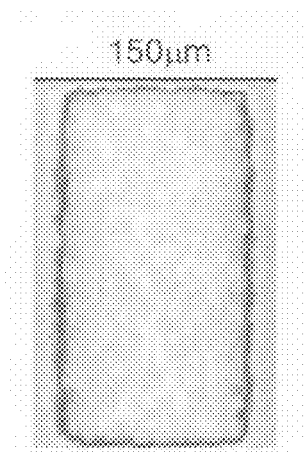
Figure 9C:
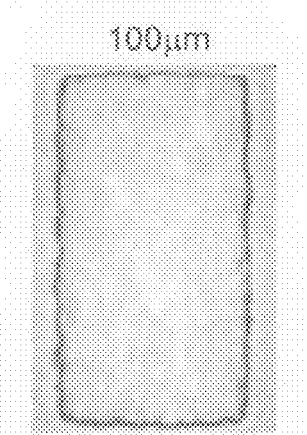
Figure 9D:
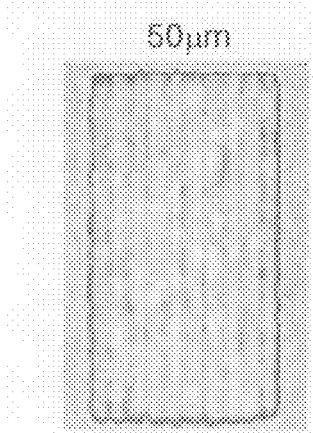

FIGS. 9A to 9D are views of illustrating brightness according to curvatures of lenticular lenses. FIG. 9A shows the brightness when the curvature of the lenticular lenses is 200 μm, FIG. 9B shows the brightness when the curvature of the lenticular lenses is 150 μm, FIG. 9C shows the brightness when the curvature of the lenticular lenses is 100 μm, and FIG. 9D shows the brightness when the curvature of the lenticular lenses is 50 μm.

In FIGS. 9A to 9D, when the curvature of the lenticular lenses is 50 μm, the lamps 122 are shown. When the curvature of the lenticular lenses is 200 μm, the lamps 122 are least shown, and the brightness is the most uniform.

Figure 10A:
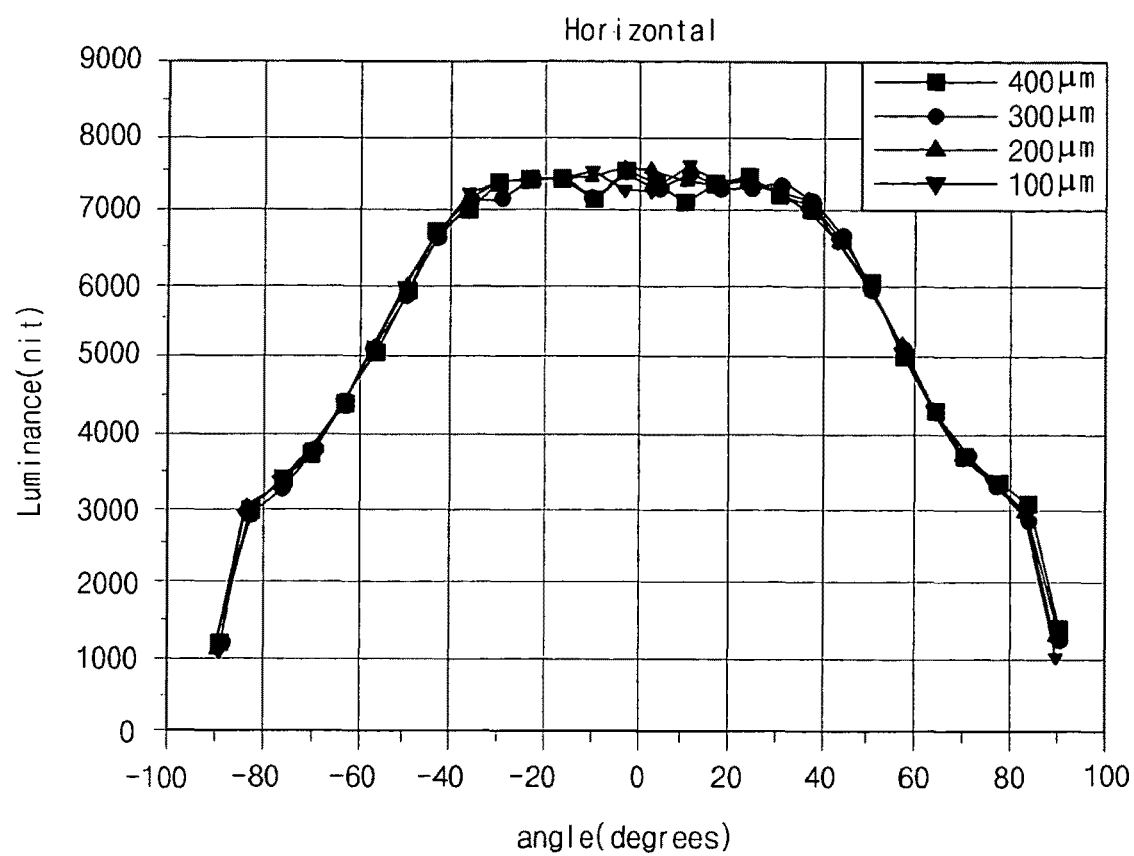
FIGS. 10A and 10B are graphs of illustrating viewing angle properties according to widths of lenticular lenses of a light-concentrating layer for a diffuser plate of the present invention.
Figure 10B:
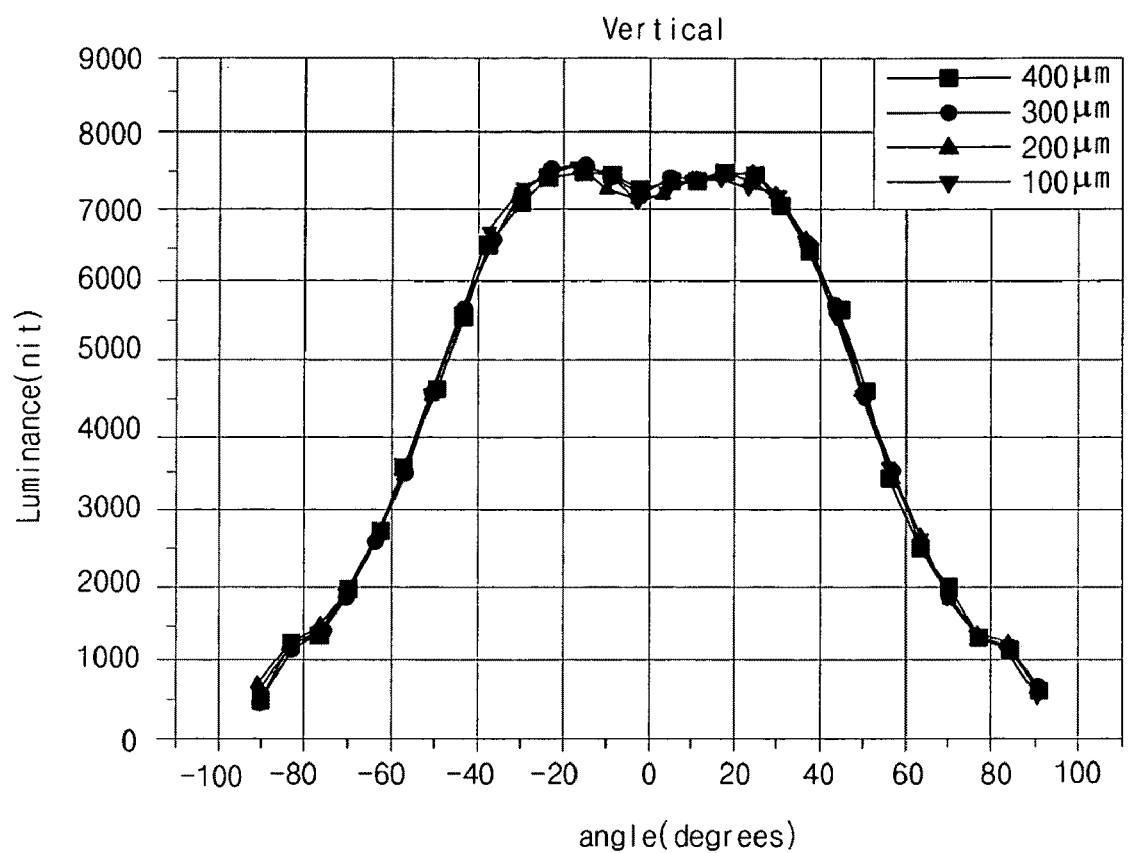

FIGS. 10A and 10B are graphs of illustrating viewing angle properties according to widths of lenticular lenses of a light-concentrating layer for a diffuser plate of the present invention. FIG. 10A shows the viewing angle properties measured according to the widths of lenticular lenses when the lenticular lenses 133a of the light-concentrating layer 133 of the diffuser plate 130 are arranged parallel with the lamps 122 of FIG. 5. FIG. 10B shows the view angles properties when the lenticular lenses 133a are arranged vertically to the lamps 122. Here, the lenticular lenses 133a have a curvature of 200 μm, and the diffusion layer 135 has a Gaussian angle of 12 degrees.

In FIGS. 10A and 10B, when the lenticular lenses have the width p of 100 μm to 400 μm, the brightness is the highest and light is most highly concentrated. The lenticular lenses with the width of 20 μm can be manufactured. The lenticular lenses may have a width within a range of 20 μm to 400 μm.

As stated above, in the present invention, the diffuser plate 130 includes the diffusion layer 135 having the Gaussian angle of 12 degrees and the light-concentrating layer 133 having the lenticular lenses 133a with the width p of 200 μm to 300 μm and the curvature of 200 μm. Accordingly, light emitted from the lamps 122 is highly concentrated and is widely scattered by the diffuser plate 130, and the front brightness is improved.

Figure 11:
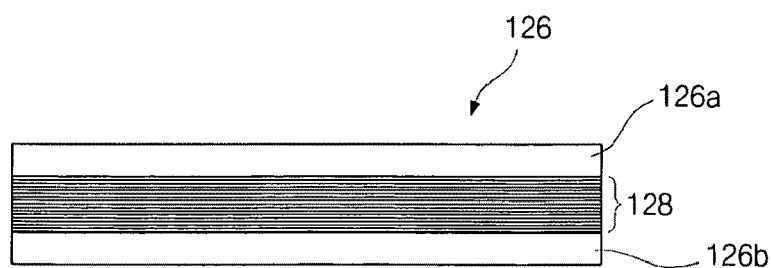
FIG. 11 is a cross-sectional view of schematically illustrating a structure of a reflective polarizing sheet according to the exemplary embodiment of the present invention.

FIG. 11 is a cross-sectional view of schematically illustrating a structure of a reflective polarizing sheet according to the exemplary embodiment of the present invention.

In FIG. 11, a reflective polarizing sheet 126 includes a reflective polarizing layer 128 and first and second diffusion layers 126a and 126b. The reflective polarizing layer 128 has a predetermined polarization axis. The first and second diffusion layers 126a and 126b are disposed at upper and lower surfaces of the reflective polarizing layer 128, respectively.

The first and second diffusion layers 126a and 126b have haze properties of more than 60%. Here, haze refers to a phenomenon whereby when light is transmitted thought a transparent film, the light is diffused by a material of the film in addition to undergoing reflection or absorption and the clarity of the film is externally obscured. Haze values are determined by the following equation (2).

Haze value (%)=((total transmitted quantity of light-quantity of light traveling straight)/transmitted quantity of diffused rays of light)×100     equation (2).

By controlling the haze values, expectable brightness and viewing angles can be obtained. If a haze value is less than 60%, light diffusion is lowered, resulting in narrowed viewing angles for the display. If the haze value is more than 90%, light transmittivity is lowered, resulting in decreased display brightness.

Therefore, the first and second diffusion layers 126a and 126b desirably have haze values within a range of 60% to 90% so that the light diffusion and the light transmittivity are uniform.

At this time, since the second diffusion layer 126b more affects the path of light than the first diffusion layer 126a, it is desirable that the second diffusion layer 126b has a haze value within a range of 60% to 70% and the first diffusion layer 126a has a haze value within a range of 70% to 90% larger than the first second diffusion layer 126b for reasons of external appearance.

The reflective polarizing sheet 126 transmits the component of incident light concentrated from the light-concentrating sheet 124 of FIG. 5, which is parallel to the polarization axis of the reflective polarizing layer 128, and reflects other components of the incident light, which are not parallel to the polarization axis.

Here, the plurality of optical sheets 120 over the lamps 122 includes one light-concentrating sheet 24 for concentrating light emitted from the lamps 122. However, to more concentrate light and increase the brightness, two light-concentrating sheets can be used.

In the present invention, a direct-type backlight unit, in which the lamps 122 are disposed directly under the optical sheets 120, is used, and an edge-type backlight unit, in which one or two lamps are disposed at one or two sides of the optical sheets 120, may be used. The edge-type backlight unit further includes a light guide panel. The lamps 122 are substantially disposed at one side or opposite sides of the light guide panel, and the optical sheets 120 are disposed over the light guide panel. The diffuser plate 130 can be constituted as occasion demands.

In the present invention, the diffuser plate includes the diffusion layer and the light-concentrating layer, and the reflective polarizing sheet has the haze value of more than 60%. Therefore, the side lobes are decreased or removed, and the light efficiency and the viewing angle properties are improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight unit for a liquid crystal display device, comprising:
a reflection sheet;
at least one lamp arranged over the reflection sheet;
a diffuser plate over the at least one lamp, the diffuser plate including a base plate of a transparent material, a diffusion layer directly on and contacting a first surface of the base plate facing the at least one lamp, and a light concentrating layer directly on and contacting a second surface of the base plate opposite to the first surface; and
optical sheets over the diffuser plate, the optical sheets including a reflective polarizing sheet,
wherein the reflective polarizing sheet includes a reflective polarizing layer having a predetermined polarization axis and first and second diffusion layers,
wherein the first diffusion layer is directly on and contacts an upper surface of the reflective polarizing layer, and the second diffusion layer is directly on and contacts a lower surface of the reflective polarizing layer opposite to the upper surface,
wherein the lower surface of the reflective polarizing layer faces the diffuser plate,
wherein the second diffusion layer has a haze value of 60% to 70% and the first diffusion layer has a haze value of 70% to 90%.

2. The backlight unit according to claim 1, wherein the diffusion layer includes beads therein or has fine patterns at a surface facing the at least one lamp, wherein the fine patterns are one of elliptical, polygonal and hologram patterns.

3. The backlight unit according to claim 1, wherein the optical sheets further include a light-concentrating sheet.

4. The backlight unit according to claim 1, wherein a plurality of lamps are disposed directly under the diffuser plate.

5. The backlight unit according to claim 1, further comprising a light guide panel under the diffuser plate, wherein the at least one lamp is disposed one side or two sides of the light guide panel.

6. The backlight unit according to claim 1, wherein the diffusion layer has a Gaussian angle of 12 degrees.

7. A liquid crystal display device, comprising:
a liquid crystal panel;
optical sheets under the liquid crystal panel, the optical sheets including a reflective polarizing sheet, wherein the reflective polarizing sheet includes a reflective polarizing layer having a predetermined polarization axis and first and second diffusion layers, wherein the first diffusion layer is directly on and contacts an upper surface of the reflective polarizing layer, and the second diffusion layer is directly on and contacts a lower surface of the reflective polarizing layer opposite to the upper surface;

a diffuser plate under the optical sheets, the diffuser plate including a diffusion layer and a light-concentrating layer having dome-shaped lenticular lenses;

at least one lamp under the diffuser plate; and a reflection sheet under the at least one lamp, wherein the lower surface of the reflective polarizing layer faces the diffuser plate, wherein the second diffusion layer has a haze value of 60% to 70% and the first diffusion layer has a haze value of 70% to 90%, wherein the diffuser plate further includes a base plate of a transparent material, wherein the diffusion layer is disposed directly on and contacts a first surface of the base plate, and the light-concentrating layer is disposed directly on and contacts a second surface of the base plate opposite to the first surface.

8. The device according to claim 7, wherein the optical sheets further include a light-concentrating sheet.

9. The device according to claim 1, wherein the light-concentrating layer is formed of a same material as the base plate and includes lenticular lenses arranged in a row and protrusively, wherein each of the lenticular lenses has a cross-section of a hemisphere having a height of 200 µm and a width within a range of 20 µm to 400 µm.

10. The device according to claim 7, wherein the light-concentrating layer is formed of a same material as the base plate, and the lenticular lenses have a height of 200 µm and a width of 20 µm to 400 µm.

* * * * *